United States Patent Office 3,535,324
Patented Oct. 20, 1970

3,535,324
CERTAIN PYRIDYL ESTERS OF ALKANE
AND ARYL SULFONATES
Martin Hamer, Skokie, Ill., assignor to International
Minerals & Chemical Corporation, a corporation of
New York
No Drawing. Filed June 14, 1967, Ser. No. 645,898
Int. Cl. C07d 31/48
U.S. Cl. 260—294.8                                 6 Claims

ABSTRACT OF THE DISCLOSURE

Novel compounds of the classes of halopyridyl or haloquinolyl alkanesulfonates, including haloalkanesulfonates, and halopyridyl or haloquinolyl α-toluenesulfonates, are useful as agricultural toxicant compositions. The compounds are prepared by the reaction, in the presence of a hydrogen halide acceptor, of an appropriate halogenated pyridinol or quinolinol with an appropriate alkanesulfonyl halide or an appropriate α-toluenesulfonyl halide. The compounds are also prepared by the reaction of an alkali metal salt of the halogenated pyridinol or quinolinol with the alkanesulfonyl halide or the α-toluene-sulfonyl halide.

BACKGROUND OF THE INVENTION

This invention relates to a new class of compounds which are useful as pesticides, e.g., insecticides and nematocides, and the preparation of the same. More particularly, this invention relates to compounds which are especially useful for controlling soil-dwelling nematodes.

Many species of soil-dwelling nematodes are plant parasites which attack and cause damage to crops and ornamental plants. They are particularly destructive to plants in areas of sandy soil and mild climatic conditions. Nematodes may do some direct damage to the stems and leaves of plants, but they do most damage below the soil surface. Nematodes damage plant roots by killing the living cells or interfering with the normal functioning of living cells, that is, by causing the plant to "react" with the formation of galls or knots on the roots.

Many methods have been used in the past for controlling plant parasitic nematodes. One of the most useful measures for controlling nematode infestation is chemical treatment. The most effective commercial nematocides, at the present, are volatile compounds which are injected into the soil. These compounds volatilize and diffuse in all directions to give a relatively high degree of control in the surface few feet of the soil. These nematocides, although highly effective, suffer from the disadvantages that they are short-lived in the soil and somewhat difficult to apply. Consequently, considerable effort has been recently expended in the development of a nematocide which is more easily applied and more residual in the soil. U.S. Pat. No. 3,228,827 issued Jan. 11, 1966, discloses that the 2,4-dihalophenyl esters of lower alkanesulfonic acids and of lower haloalkanesulfonic acids are effective non-volatile nematocides with long residual activity. The compound 2,4-dichlorophenyl methanesulfonate has been reported to be outstanding both in degree of activity and in long residual effect.

SUMMARY OF THE INVENTION

This invention is based on the discovery of new nonvolatile nematocides with long residual activity, which compounds are also effective insecticides. In accordance with the present invention, growing plants are protected from plant-attacking nematodes and insects by treating the environment thereof (i.e., the locus where control is to be effected) with a non-phytotoxic pesticidally-effective quantity of a halopyridyl alkanesulfonate, including a halopyridyl haloalkanesulfonate, or a halopyridyl α-toluenesulfonate, including a halopyridyl substituted α-toluenesulfonate, represented by the formula:

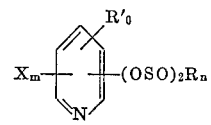

or a haloquinolyl alkanesulfonate, including a haloquinolyl haloalkanesulfonate, or a haloquinolyl α-toluenesulfonate, including a haloquinolyl substituted α-toluenesulfonate, represented by the formula:

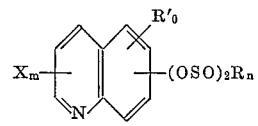

The novel compounds of this invention may be prepared by the reaction, in the presence of an acid acceptor (i.e., hydrogen halide acceptor), of the appropriate halogenated pyridinol represented by the formula:

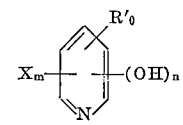

or appropriate halogenated quinolinol represented by the formula:

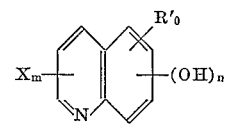

with the appropriate $C_1$–$C_{18}$ alkanesulfonyl halide $C_1$–$C_{18}$ haloalkanesulfonyl halide, α-toluenesulfonyl halide or substituted α-toluenesulfonyl halide. Alternatively, the compounds of this invention are also conveniently prepared by the reaction of an alkali metal salt, e.g., sodium or potassium salt, of one of the aforementioned halogenated pyridinols or quinolinols with an appropriate one of the aforementioned sulfonyl halides.

In the foregoing formulas, X represents halogen, R is a straight or branched chain alkyl or haloalkyl radical containing from 1 to 18 carbon atoms, benzyl or a substituted benzyl radical, R' is methyl or ethyl, $m$ is an integer from 1 to 3, inclusive $n$ is 1 or 2, and $o$ is an integer from 0 to 2, inclusive. It will be evident that $m$, $n$ and $o$ will not total more than 5 in the foregoing single-ring compounds. Furthermore, the single ring compounds will contain at least one —$OSO_2R$ (or —OH) group in the two or three position in the ring. The condensed ring compounds of the foregoing formulas may contain the radicals —X, —$OSO_2R$ (or —OH), and —R' all on the benzene portion thereof (in which event $m$, $n$ and $o$ will not total more than 4), all on the pyridine portion thereof (in which event $m$, $n$ and $o$ will not total more than 3) or on both rings. Preferred compounds are those wherein X is either chlorine or bromine, R is an alkyl radical or haloalkyl radical containing from 1 to 4 carbon atoms, benzyl, or a substituted benzyl radical, and $m$ and $n$ total 2 to 4.

The preferred class of compounds of the present invention are the 2-pyridyl alkanesulfonates, with 3,5-dichloro-2-pyridyl methanesulfonate being the preferred compound. Other compounds of this invention falling within the foregoing formulas are 3,5-dibromo-2-pyridyl methanesulfonate, 5-chloro-2-pyridyl methanesulfonate, 6-chloro-2-pyridyl α-toluenesulfonate, 2-chloro-3-pyridyl methanesulfonate, 2-bromo-3-pyridyl methanesulfonate, 6-chloro-2-pyridyl 1-butanesulfonate, 5-chloro-2-pyridyl 2,3-dichloro-1-propanesulfonate, 6-chloro - 2 - pyridyl-2-bromo-1-ethanesulfonate, 3,5,6-trichloro-2-pyridyl methanesulfonate, 6-chloro-3,5-dibromo-2-pyridyl methanesulfonate, 3,5-dichloro-6-methyl-2-pyridyl methanesulfonate, 5-bromo-8-quinolyl methanesulfonate, 7-chloro-4-quinolyl 1-chloroethanesulfonate, 4-chloro-8-quinolyl ethanesulfonate, 5-chloro-8-quinolyl methanesulfonate, 5,7-dibromo-8-quinolyl methanesulfonate, 5,7-dichloro-8-quinolyl methanesulfonate, and 5,7-dibromo-8-quinolyl 3-chloropropanesulfonate.

DESCRIPTION OF THE PREFERRED EMBODIMENTS

In one aspect, therefore, the present invention relates to the preparation of novel compounds useful as agricultural toxicant compositions, vis., nematocides and insecticides, by the reaction of a halogenated pyridinol or quinolinol with a sulfonyl halide in the presence of a hydrogen halide acceptor.

Useful halogenated pyridinols or quinolinols include 3,5-dichloro-2-pyridinol, 5-bromo-8-quinolinol, 5-chloro-2-pyridinol, 5-chloro-8-quinolinol, 6-chloro-2-pyridinol, 3-chloro-2-pyridinol, 3-bromo-2-pyridinol, 5,7-dibromo-8-quinolinol, 5,7-dichloro-8-quinolinol, 5-iodo-2-pyridinol, 5,7-diiodo-8-quinolinol, 6 - bromo-2-pyridinol, 3,5,6-trichloro-2-pyridinol, 6-chloro-3,5-dibromo-2-pyridinol, 5-bromo-2-pyridinol, 3,5 - dibromo-2-pyridinol, 5-chloro-6-methyl-2-pyridinol, 5-bromo-6-methyl-2-pyridinol, 3,5-dichloro-6-methyl-2-pyridinol, and 3,5-dibromo-6-methyl-2-pyridinol.

Sulfonyl halides which are useful in the present invention include alkane- and haloalkanesulfonyl halides such as methanesulfonyl chloride, 1-butanesulfonyl chloride, 1-propanesulfonyl chloride, 2-propanesulfonyl chloride, 1-pentanesulfonyl chloride, 1-chloroethanesulfonyl chloride, 2-chloro-1-ethanesulfonyl chloride, 2,3-dichloro 1-propanesulfonyl chloride, 1,2-dichloroethanesulfonyl chloride, ethanesulfonyl chloride, trichloromethanesulfonyl chloride, chloromethanesulfonyl chloride, and bromomethanesulfonyl chloride. Other useful sulfonyl halides include α-toluenesulfonyl halides such as α-toluenesulfonyl chloride and α-toluenesulfonyl bromide and substituted α-toluenesulfonyl halides, i.e., compounds containing substituents on the phenyl ring which are inert under the reaction conditions such as halo (e.g., chloro, bromo, and iodo), cyano, nitro and methyl. Examples of such substituted α-toluenesulfonyl halides include 4-chloro-α-toluenesulfonyl chloride, 4-bromo-α-toluenesulfonyl chloride, 2,4-dichloro-α-toluenesulfonyl chloride, 4-nitro-α-toluenesulfonyl chloride, 4-cyano-α-toluenesulfonyl chloride 4-methyl-α-toluenesulfonyl chloride.

The relative proportions of the reactants in preparing the novel compounds of this invention may vary over a relatively wide range. Generally an excess of either the halogenated pyridinol (or quinolinol) or the sulfonyl halide and hydrogen halide acceptor may be used. The sulfonyl halide is preferably employed in at least a stoichiometric amount and more preferably in a slight excess. A slight excess of the hydrogen halide acceptor is also preferably utilized except when it also serves as the reaction medium, as hereinafter described, and greater quantities are required. For example, in the preparation of compounds of this invention containing only one sulfonate group, that is, when n in the foregoing formulas is one, the mole ratios of the sulfonyl halide and hydrogen halide acceptor (which is not the reaction medium) to the halogenated pyridinol (or quinolinol) will be in the range of from about 0.5:1 to about 4:1, preferably from about 1:1 to about 2:1.

The reaction is carried out in a non-aqueous reaction medium, i.e., a solvent or mixture of solvents, which does not interfere with the desired reaction. Suitable reaction media include inert solvents such as ketones, e.g., butanone and acetone, halogenated hydrocarbons, e.g., ethylene dichloride and chlorobenzene, aromatic hydrocarbons, e.g., benzene and toluene, esters, e.g., ethyl acetate, and ethers e.g., dioxane. In some instances the same material pyridine as for example may serve the dual function of a solvent and an acid acceptor. The reactants may be dissolved together in the same solvent, or individually in separate quantities of the same or different solvents comprising the reaction medium, which quantities of solvents are then combined.

Bases in addition to pyridine which are useful as hydrogen halide acceptors in the reaction of the instant invention include sodium or potassium hydroxide, sodium or potassium carbonate, and tertiary amines such as triethylamine, tripropylamine, dimethyl aniline, and substituted pyridines such as the lutidines and picolines.

Reaction temperatures in the range of about room temperature, e.g., 20° C., up to about the reflux temperature of the reaction mixtures, and even higher, are useful. The reaction is preferably carried out at an elevated temperature of from about 40° to about 150° C. to obtain maximum yield for a given length of reaction time when the non-aqueous system is employed. In general, reaction temperatures in the preferred range will provide an increase in yield and a reduction in the time required for completion of the reaction as compared to reaction temperatures outside of the preferred range. Satisfactory yields are obtained when the reaction mixture is maintained in the preferred range for at least about 15 minutes. However, maximum yields are obtained when longer reaction times, e.g., up to about six hours or longer are used.

The product is separated from the by-product hydrogen halide salt of the acceptor and recovered by conventional techniques, as for example, by extraction, distillation, filtration, crystallization and combinations of these techniques.

In another aspect, this invention relates to the preparation of the compounds of this invention by the reaction, in a suitable inert reaction medium, of an alkali metal salt, e.g., sodium or potassium salt, of a halogenated pyridinol or quinolinol of the foregoing formulas with a sulfonyl halide as hereinbefore described.

The relative proportions of the reactants in this method may also vary over a relatively wide range and an excess of either of the reactants may be used. However, it is preferred to employ the sulfonyl halide in at least a stoichiometric amount.

The reaction mixtures for carrying out this method may be prepared in a variety of ways. For example, the sulfonyl halide (neat or in solution in a solvent such as benzene), is added to a solution or dispersion of the salt of the halogenated pyridinol or quinolinol. Alternatively, the salt of the halogenated pyridinol or quinolinol may be added to a solution of the sulfonyl halide, or the two reactants may be simultaneously added to a suitable reaction medium. The aforementioned reaction media are generally useful for this method of preparation also.

The compounds are most conveniently prepared by the addition of the sulfonyl halide (neat or in solution in a water-immiscible organic solvent) to an aqueous solution of the salt of the halogenated pyridinol or quinolinol. This method facilitates the separation of the by-product hydrogen halide salt from the product sulfonate. The by-product remains in solution in the aqueous phase and the product sulfonate either precipitates when the sulfonyl halide is added neat or remains in solution when the sulfonyl halide is added in solution in a solvent in which the product sulfonate is also soluble. The product sulfonate is recovered from the organic solvent by conventional techniques such as by evaporation of the solvent. Furthermore, the reaction is essentially complete in about fifteen minutes at room temperature and affords a good yield of a product of good quality. Maximum yields are obtained when a pH of about 9 to 12 is maintained during the reaction by the addition of a suitable base.

The compounds of this invention are utilized in still another aspect to control nematodes and insects by applying a toxic amount of the same to the loci of infestation or potential infestation. The compounds may be advantageously employed for protecting growing plants from soil-dwelling nematodes by disseminating a nematocidally effective quantity of the compounds in the soil. Soil-dwelling nematodes which may be controlled by the compounds of this invention include cyst-forming nematodes of the genus Heterodera, endoparsitic nematodes, e.g., of the genera Ditylenchus, Meloidogyne, Nacobbus, Pratylenchus, etc., and ectoparasitic nematodes, e.g., of the genera Belanolaimus, Cacopaurus, Dolichodorus, Trichodorus, etc.

The amount of the compounds of this invention which are introduced into the soil for achieving effective control of soil-dwelling nematodes will vary within wide limits depending upon factors, among others, as the time of application, climatic conditions, the method of application, the number of applications, the activity of the specific compound being utilized, and the like. Effective concentrations of the compounds for the control of soil-dwelling nematodes will generally lie within the range of from about 2 to about 200 pounds per acre of land. Generally application rates of from about 5 to about 100 pounds of the compounds per acre are preferred.

Most compounds of this invention are solids at ordinary temperatures and, accordingly, may be applied to the soil in a variety of forms. For example, they may be applied to the soil by merely being mixed, in finely divided form, with the soil to be treated. Alternatively, they may be applied to the soil in admixture with a suitable inert solid carrier. For example, the compounds may be mechanically mixed or ground with an inert solid diluent such as talc, mica, a clay such as one of the bentonites, fuller's earth and the like. Alternatively, the compounds may be dissolved in a suitable solvent which is then mixed with the solid diluent and evaporated during or after the mixing operation.

The sulfonates may also be applied to the soil while in a solution, dispersion, or emulsion in a suitable inert liquid medium such as water. Water is preferred for the purposes of convenience and economy. Inasmuch as the sulfonates of this invention are not very soluble in water, water-base spray solutions of the compounds can be prepared by dissolving at least one of the compounds in a suitable organic liquid such as acetone to form a concentrated solution which is then mixed with a much larger volume of water to form a dispersion or solution of the desired concentration. Alternatively, the compounds of this invention can be emulsified in water by the employment of a suitable emulsifying agent, and the emulsion is then applied to the soil. Representative emulsifying agents include alkali metal salts of long chain aliphatic sulfates and alkylaryl sulfonates, wholly or partially neutralized sulfuric acid derivatives or petroleum oil, polyoxyalkylene derivatives of phenols and fatty acids, and the like.

Alternatively, the compounds may also be applied to the soil in solutions in suitable water-immiscible organic solvents such as benzene, kerosene, chlorinated hydrocarbons, xylene, and various non-phytotoxic hydrocarbon fractions which are ordinarily used for such purposes, e.g., spray oils.

Another method of utilizing the compounds of this invention for protecting plants from soil-dwelling nematodes is to dip the roots of plants being transplanted in a solution, dispersion or emulsion containing a nematocidally effective quantity, e.g., about 20 to about 10,000 p.p.m., of a sulfonate of this invention. This method is especially useful for protecting plants such as tomato and tobacco which are normally transplanted during some stage of growth.

The compounds of this invention may also be used for combating above-ground feeder nematodes of the genera Anguina, Aphelenchoides and Ditylenchus and insects, e.g., aphids. For these uses, the sulfonates useful in accordance with the present invention may be similarly employed in the form of solutions, dispersions or emulsions, wettable powders and dusts. A solution, dispersion or emulsion of one of the compound is generally pesticidally effective when it contains about 20 to about 10,000 parts per million of the sulfonate. The solution, dispersion or emulsion is usually sprayed on the plants in a sufficient quantity so that the material just begins to run off the leaves and stems. It is also possible to apply a paste containing a compound of this invention to the stem, branch or trunk of a tree or bush.

The following non-limiting examples will serve to further illustrate this invention.

Example I

A quantity, 25.7 grams (0.16 mole), of 3,5-dichloro-2-pyridinol was dissolved in 300 milliliters of a warm mixture of butanone and 1,2-dichloroethane. Anhydrous sodium carbonate, 16.6 grams (0.16 mole), was added to the resulting solution. Methane-sulfonyl chloride was then added in the amount of 18.0 grams (0.16 mole), and the mixture was stirred and heated at reflux for four hours. The hot reaction mixture was filtered and the filtrate evaporated. The resultant crude product was purified by recrystallization from benzene and then hexane to give 15.6 grams (41% yield) of white 3,5-dichloro-2-pyridyl methanesulfonate crystals having a melting point of 64°–65° C. and the following analysis: Calculated for $C_6H_5Cl_2NO_3S$ (percent): 29.77 C; 2.08 H; 29.29 Cl; 13.25 S. Found (percent): 30.09 C; 2.15 H; 28.97 Cl; 13.07 S.

Example II

The compound 6-chloro-2-pyridyl methanesulfonate was prepared by adding 22.9 grams (0.20 mole) of methanesulfonyl chloride with stirring to a solution of 25.9 grams (0.20 mole) of 6-chloro-2-pyridinol in 100 milliliters of pyridine. The solution was heated at reflux (120° C.) for two hours, cooled and poured into ice water. The resultant oil was taken up in 200 milliliters of benzene, dried and stripped in vacuo. This gave a brown, partly-crystalline product which was spread on a porous plate to remove adherent oil, leaving 14.1 grams of a tan solid melting at 32°–55° C. Recrystallization of the tan solid from a mixture of 10 parts of petroleum ether and 1 part of acetone gave 4 crops. The first crop was the largest (8.4 grams, representing a 20% yield) and the only one having a narrow melting point range (34°–34.5° C.). Another recrystallization of this material from a mixture of 8 parts of cyclohexane and 1 part ethylene dichloride gave transparent plates, all metling at about 34°–35° C.

*Analysis.*—Calculated for $C_6H_6ClNO_3S$ (percent): 34.72 C; 2.91 H; 17.08 Cl; 6.76 N; 15.44 S. Found (percent): 35.15 C; 3.16 H; 16.77 Cl; 6.54 N; 15.13 S.

Example III

Anhydrous sodium carbonate, 10.6 grams (0.10 mole), was added to a solution of 13.0 grams (0.10 mole) of 6-chloro-2-pyridinol dissolved in 200 milliliters of dried 2-butanone. The compound 1-butanesulfonyl chloride was added in an amount of 15.7 grams (0.10 mole) and the resulting mixture was stirred and heated at reflux for 4 hours. The mixture was then allowed to stand overnight, after which it was filtered and the filtrate was evaporated under vacuum to leave an amber oil. Chilling of the amber oil caused about 2 grams of impure 6-chloro-2-pyridinol to crystallize. The remaining oil was vacuum distilled through a Claisen head and the product was collected in two fractions: (1) 126°–131° C. (0.025 mm.), $n_D^{26}$ 1.5100, 7.7 grams; and (2) 131°–136° C. (0.025 mm.), $n_D^{26}$ 1.5103, 4.1 grams. The collected product was a light yellow oil having a combined weight of 11.8 grams, representing a 47% yield.

*Analysis.*—Calculated for $C_9H_{12}ClNO_3S$ (percent): 43.30 C; 4.81 H; 5.61 N. Found (percent): 43.31 C; 4.85 H; 5.53 N.

Example IV

A solution of 19.4 grams (0.15 mole) of 6-chloro-2-pyridinol and 28.6 grams (0.15 mole) of α-toluenesulfonyl chloride in 300 milliliters of dried butanone was refluxed for four hours in the presence of 15.9 grams (0.15 mole) of anhydrous sodium carbonate. The mixture was cooled and then poured into cold water to form two layers. The upper layer was separated from the lower layer and then poured into cold water. The oil layer thus formed solidified and was removed by filtration and dried. The product was purified by recrystallization first from benzene and then from a mixture of benzene and cyclohexane to give 16.4 grams (39% yield) of white crystals of 6-chloro-2-pyridyl α-toluenesulfonate, M.P. 102°–103° C.

*Analysis.*—Calculated for $C_{12}H_{10}ClNO_3S$ (percent): 50.80 C; 3.55 H; 12.49 Cl; 11.30 S. Found (percent): 50.73 C; 3.60 H; 12.58 Cl; 11.30 S.

Example V

Methanesulfonyl chloride, 11.5 grams (0.10 mole), was added dropwise in about two minutes to a solution of 18.0 grams (0.10 mole) of 5-chloro-8-quinolinol in 150 milliliters of pyridine. The resulting solution was heated at reflux for two hours, and then allowed to stand overnight and cool slowly. A number of crops of pyridine hydrochloride crystallized. The final filtrate was evaporated to dryness and the crude product purified by recrystallization from heptane. A total of 5.3 grams (27% yield) of pure 5-chloro-8-quinolyl methanesulfonate, M.P. 106°–107° C. was obtained.

*Analysis.*—Calculated for $C_{10}H_8ClNO_3S$ (percent): 13.65 Cl; 5.38 N; 12.10 S. Found (percent): 13.76 Cl; 5.44 N; 12.44 S.

Example VI

Methanesulfonyl chloride in the amount of 11.5 grams (0.10 mole) was added to a solution of 30.3 grams (0.10 mole) of 5,7-dibromo-8-quinolinol and 7.9 grams (0.10 mole) of dried pyridine in 250 milliliters of benzene. The resulting mixture was heated at reflux for four hours and then allowed to cool. The cooled reaction mixture was stirred with 250 milliliters of water and filtered. The solid removed by the filtration was 15.1 grams of unreacted 5,7-dibromo-8-quinolinol. The benzene layer was separated, washed with water until neutral, and evaporated to leave a solid. The solid was purified by recrystallization from chloroform and then 2-butanone to give 7.2 grams (19% yield) of pale tan crystals of 5,7-dibromo-8-quinolyl methanesulfonate. The product melted at 172.5–173.5° C.

*Analysis.*—Calculated for $C_{10}H_7Br_2NO_3S$ (percent): 3.68 N; 8.40 S. Found (percent): 3.82 N; 8.03 S.

Example VII

The compound 3,5,6-trichloro-2-pyridyl methanesulfonate was prepared in another experiment wherein 26.9 grams (0.235 mole) of methanesulfonyl chloride was added at once to a solution of 46.8 grams (0.235 mole) of 3,5,6-trichloro-2-pyridinol in 250 milliliters of dried butanone to which 24.9 grams (0.235 mole) of sodium carbonate had been added. The mixture was heated at reflux for 4½ hours and filtered hot. Cooling of the filtrate caused the precipitation of less than 1 gram of a high melting material which burned leaving ash. The filtrate was evaporated to about ½ to volume and chilled. This resulted in the formation of large crystals, which were removed by filtration and quickly washed with cold methanol. Additional partial evaporation of the butanone solution yielded four more crops of transparent square plates which were washed with cold methanol to yield 43.6 grams (67% yield) of product having a melting point of 67°–68° C. and the following analysis: Calculated for $C_6H_4Cl_3NO_3S$ (percent): 26.06 C; 1.46 H; 5.07 N. Found (percent): 25.99 C; 1.56 H; 4.96 N.

Example VIII

In this experiment, 7.0 grams (0.66 mole) of methanesulfonyl chloride dissolved in 50 milliliters of benzene was added to an aqueous solution of the sodium salt of 3,5 - dichloro-2-pyridinol which was prepared by the addition of 10.0 grams (0.06 mole) of 3,5-dichloro-2-pyridinol to 85 grams of a 3% aqueous solution of sodium hydroxide. The addition of the solution of methanesulfonyl chloride in benzene to the solution of the sodium salt of the pyridinol was carried out at room temperature in five minutes while the pH of the reaction mixture was kept at about 10 to 11 by the concurrent addition of a 10% sodium hydroxide solution (about 7 milliliters). The mixture was stirred for an additional fifteen minutes while its pH was maintained at the above level by adding additional base. Another 50 milliliters of benzene was added and the mixture separated into an aqueous layer and a benzene layer. The benzene layer was separated, and washed with 5% sodium hydroxide and then water until neutral. The benzene was removed by evaporation, leaving an oil which crystallized to give 10.2 grams (69% yield) of white 3,5-dichloro-2-pyridyl methanesulfonate crystals having a melting point of 60°–62.5° C.

Example IX

The nematocidal activity of 3,5-dichloro-2-pyridyl methanesulfonate was compared in the following tests with the nematocidal activity of 2,4-dichlorophenyl methanesulfonate of U.S. Pat. No. 3,228,827 and several commercially available nematocides.

In these tests, the procedure consisted of thoroughly mixing the test compound with a quantity of soil heavily infested with the root-knot nematode (Meloidogyne sp.) in an amount to provide the desired dosage of the test compound in the soil. The soil was rolled, held for 48 hours in capped jars, and then transferred to clay pots. A seedling tomato (Rutgers variety) was transplanted into each pot. After about 4 or 5 weeks each tomato plant was removed from the soil, the soil was washed from the roots of the plant, and the amount of galling caused by the nematodes was compared by experienced observers with tomato seedlings planted in untreated nematode-infested soil.

The dosage used and the amount of galling obtained at each dosage of the test compounds is set out in Table I. Each number indicated at each dosage level stands for the control obtained in a separate test. The following rating scale was used:

5 is no galling or 100% control.
4 is very light galling.
3 is light galling.
2 is moderate galling.
1 is severe galling, equal to plants in untreated soil.

TABLE I

| Compound | Dosage, lbs./acre | Control |
|---|---|---|
| 3,5-dichloro-2-pyridyl methanesulfonate | 37 | 5,5,5 |
|  | 18 | 5,5,5 |
|  | 9 | 4,4,4 |
|  | 4.5 | 4,4,3 |
| 2,4-dichlorophenyl methanesulfonate | 37 | 4,4,4 |
|  | 18 | 3,2,2 |
|  | 9 | 2,2,2 |
|  | 4.5 | 1,1,1 |
| 1-chloro-2,3-dibromopropane | 37 | 4,4 |
|  | 18 | 3,3 |
|  | 9 | 1,1 |
| Phenyl N,N'-dimethylphosphorodiamidate | 37 | 4,5,4,4 |
|  | 18 | 3,3,4,4 |
|  | 9 | 2,2,3,3 |
| 3,5-dimethyl-1,3,5,2H-tetrahydrothiadiazine-2-thione | 37 | 5,5 |
|  | 18 | 5,5 |
|  | 9 | 3,3 |

The above data clearly demonstrate the superiority in nematocidal activity of 3,5-dichloro-2-pyridyl methanesulfonate over 2,4-dichlorophenyl methanesulfonate. It will be noted that 100% control was obtained with the former compound at a dosage rate of 37 pounds per acre whereas there was still some very light galling at the same dosage rate when the latter compound was used. However, when 3,5-dichloro-2-pyridyl methanesulfonate was used at a rate of 4.5 pounds per acre there was only very light galling in two of the tests and light galling in the third test. In contradistinction, no control was obtained when 2,4-dichlorophenyl methanesulfonate was used at the rate of 4.5 pounds per acre. Similar results will be noted when the activity of 3,5-dichloro-2-pyridyl methanesulfonate is compared with the activity of the other three compounds, which are commercially available as nematocides.

Example X

As illustrative of the nematocidal activity of other compounds falling within the scope of this invention, 6-chloro-2-pyridyl methanesulfonate and 5-chloro-2-pyridyl methanesulfonate, as representative monohalopyridyl alkanesulfonates, 6-chloro-2-pyridyl α-toluenesulfonate, as a representative halopyridyl α-toluene-sulfonate, and 5,7-dichloro-8-quinolyl methanesulfonate, as a representative haloquinolinyl alkanesulfonate, were tested as above. The results of these tests are set out in Table II.

TABLE II

| Compound | Dosage, lbs./acre | Control |
|---|---|---|
| 6-chloro-2-pyridyl methanesulfonate | 75<br>37 | 5, 4<br>4, 4 |
| 5-chloro-2-pyridyl methanesulfonate | 75<br>37 | 5, 5<br>4, 4 |
| 6-chloro-2-pyridyl α-toluenesulfonate | 150 | 3, 2 |
| 5,7-dichloro-8-quinolyl methanesulfonate | 150<br>75 | 5, 5<br>3, 2 |

Example XI

Tests were conducted to compare the insecticidal activity of 3,5-dichloro-2-pyridyl methanesulfonate with S-(1,2-dicarbethoxyethyl) - O,O-dimethyl phosphorodithioate, a commonly used commercial insecticide. In these tests, a potted Nasturtium plant infested with the bean aphid (*Aphis fabae*) was sprayed, at the desired dosage, to run-off with one of the chemicals under test. After 24 hours the aphids were observed and the degree of control rated. The results of these tests are given in Table III.

TABLE III

| Compound | Percent kill of aphids at— | | |
|---|---|---|---|
| | 50 p.p.m. | 25 p.p.m. | 12.5 p.p.m. |
| 3,5-dichloro-2-pyridyl methanesulfonate | 100 | 78 | 20 |
| S-(1,2-dicarbethoxyethyl)-O,O-dimethyl phosphorodithioate | 100 | 100 | 35 |

It will be noted from the above that 3,5-dichloro-2-pyridyl methanesulfonate is as effective as S-(1,2-dicarbethoxyethyl)-O,O-dimethyl phosphorodithioate at a concentration of 50 p.p.m. At concentrations of 25 and 12.5 p.p.m., 3,5-dichloro-2-pyridyl methanesulfonate was not as effective as, but still compared very favorably with, the commercial insecticide.

I claim:
1. A compound having the following structure

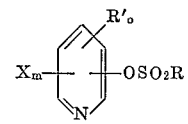

wherein X represents chlorine, bromine or iodine, R is a lower-alkyl or halo lower-alkyl radical containing from 1 to 18 carbon atoms, benzyl radical or a substituted benzyl radical containing on the ring a substituent of the group consisting of halo, nitro, cyano and methyl, R' is methyl or ethyl, $m$ is an integer from 1 to 3, and $o$ is an integer from 0 to 2, inclusive, provided that in said formula said compound contains said —$OSO_2R$ group in the two or three position on the ring and $m$ and $o$ do not total more than 4.

2. A compound in accordance with claim 1 wherein X is chlorine or bromine, and R is an alkyl or haloalkyl radical containing from 1 to 4 carbon atoms, benzyl radical or a substituted benzyl radical containing on the ring a substituent of the group consisting of halo, nitro, cyano and methyl.

3. A compound in accordance with claim 2 wherein said compound is of the formula:

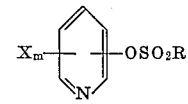

4. A compound in accordance with claim 3 wherein R is a lower alkyl radical.

5. A compound in accordance with claim 4 wherein said compound contains said —$OSO_2R$ group in the two position on the ring.

6. A compound in accordance with claim 5 wherein said compound is 3,5-dichloro-2-pyridyl methanesulfonate.

References Cited

Chemical Abstracts (I), Buchmann, vol. 53, Par. 2229–2230, 1959.

Chemical Abstracts (II), Bankovskis et al., vol. 61, Par. 13, 276, 1964.

ALAN L. ROTMAN, Primary Examiner

U.S. Cl. X.R.

71—94; 260—283; 424—258, 263

UNITED STATES PATENT OFFICE
CERTIFICATE OF CORRECTION

Patent No. 3,535,324          Dated October 20, 1970

Inventor(s) Martin Hamer

It is certified that error appears in the above-identified patent and that said Letters Patent are hereby corrected as shown below:

Column 2, lines 5-10, and Column 2, lines 15-20, that portion of the formula "$(OSO)_2R_n$", each occurrence, should read --$(OSO_2R)_n$--; Column 2, line 51, "3, inclusive" should read -- 3, inclusive, --. Column 6, line 52 "metling" should read -- melting --. Column 9, line 34, in Table II, "37" should be -- 35 --.

Signed and Sealed (SEAL)
Attest:

Edward M. Fletcher, Jr.
Attesting Officer

WILLIAM E. SCHUYLER, JR.
Commissioner of Patents